July 23, 1929.　　　G. E. SWARTZ　　　1,721,648
ADJUSTABLE WORK CONTACTING MEANS FOR JIGS
Filed March 22, 1926
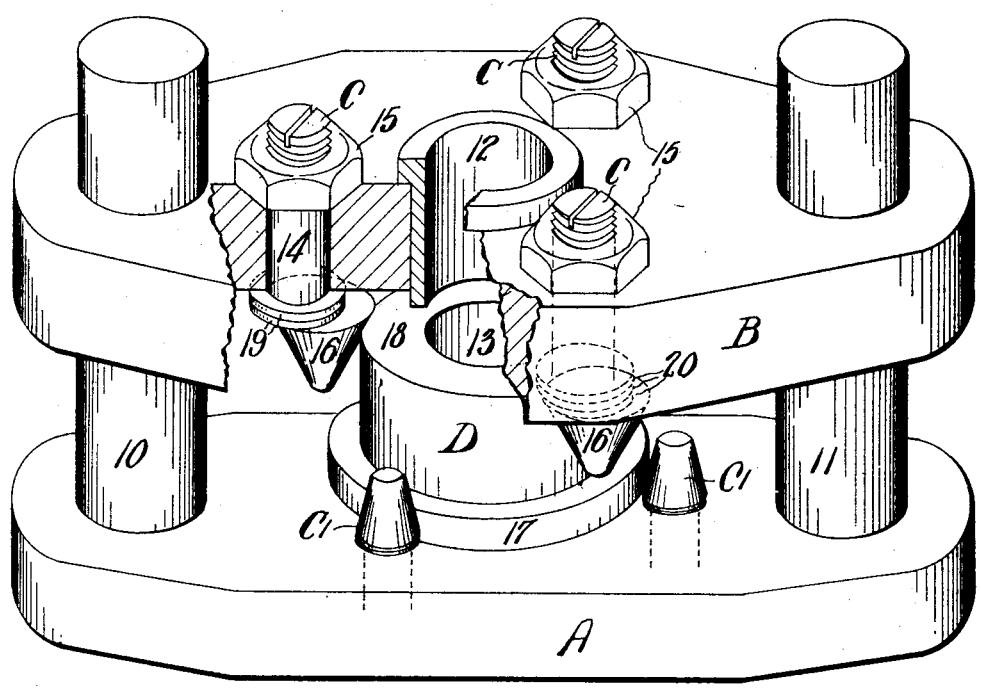
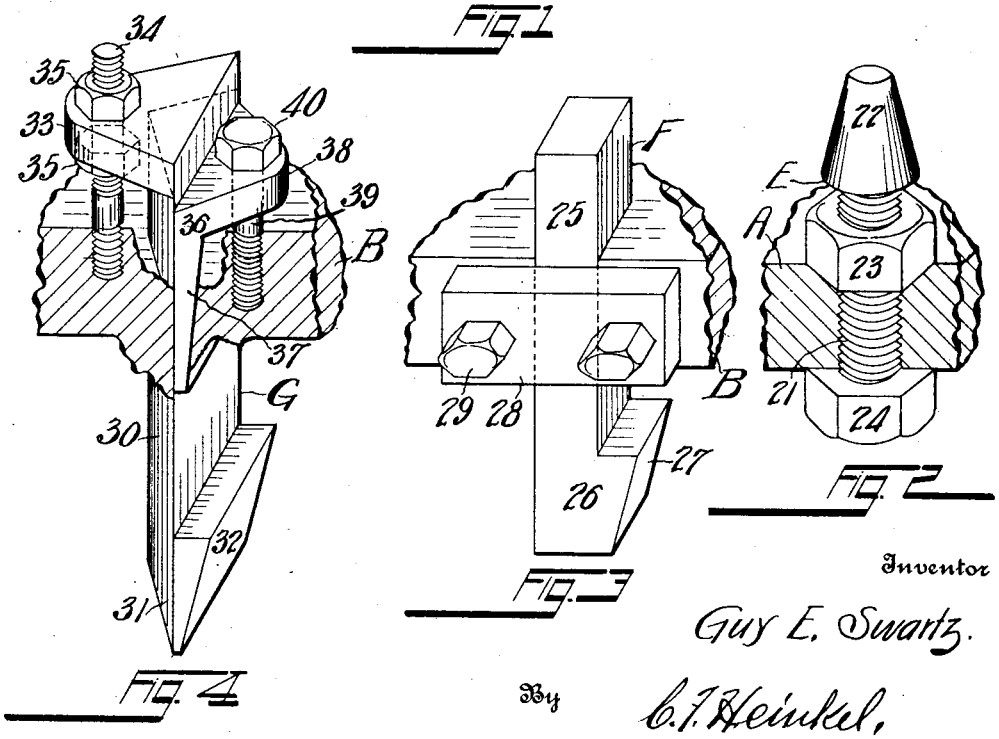
Inventor
Guy E. Swartz.
By C. T. Heinkel,
Attorney Patented July 23, 1929.

1,721,648

UNITED STATES PATENT OFFICE.

GUY E. SWARTZ, OF DETROIT, MICHIGAN.

ADJUSTABLE WORK-CONTACTING MEANS FOR JIGS.

Application filed March 22, 1926. Serial No. 96,661.

My invention relates to means for contacting objects to relate or to retain the same in desired relations to other members of a structure.

The predominating objects of my invention are:—

(A) A simple and efficient means for contacting objects to either relate the same to other members of a structure, or to retain the same on another member of a structure, or to both relate and retain the same in desired position in or on a structure.

(B) A means defined in paragraph A which is adjustable to permit changes in the relation of the object to the structure.

(C) A means defined in paragraph A which is securely held in adjusted position so that the adjustment thereof is not changed when the structure is in use.

(D) A means defined in paragraph A which needs no accurate machining of the structure.

(E) A means defined in paragraph A which needs no accurate machining.

Generally speaking, contacting means are used to locate objects in certain relations to each other; as in the drill jig shown in the accompanying drawing for instance.

In devices, such as herein shown and described, it is necessary to have and to maintain contact faces in a definite distance relation to an object to be centralized or located or positioned or to other parts of the device. Due to the continued use of these surfaces, some of them may wear more than others, or may shift, and thereby destroy the proper locating or clamping effect or facility thereof.

Quite frequently castings or forgings or other objects are changed in the form of the portion contacted by the contact faces, or a change may become necessary between the portion of an object contacted by the contact faces and another part of the device as when relations between the bushing and the object shown in the accompanying drawing is to be changed.

My invention aims to provide the necessary means to adjust the contact faces to take up wear thereof, to adjust the contact faces to meet changes in the contour of an object or in the position thereof in relation to other parts of a device, or to adjust the contact faces to compensate for inaccurate machining of parts of the device or to vary the clamping effect or facility thereof by the most simple and most easily operable means.

Generally speaking, my invention uses individual contact plugs and provides each with the necessary means to attain the advantages mentioned.

In order to illustrate my invention, I have embodied the same, in the present instance, in a drill jig and have shown the same and different formations of plug members in the accompanying drawing. It is to be understood, however, that the embodiment so shown, or the different formations of plug members so shown, is neither the only possible embodiment of my invention nor the only possible formation of plug members and that my invention is capable of other embodiments and of other formations of elements and of other arrangements of elements within the scope of the appended claims.

In the accompanying drawing mentioned:

Fig. 1 is a general perspective view of a drill jig with an object therein, embodying the features of my invention, partly in section to show relations of elements more clearly, and such a jig provided with contact plugs on the bottom plate to locate the object in relation to the bottom jig plate and on the top jig plate to locate the top plate in relation to the object and also shows the contact plugs in the upper plate as having eccentric heads and those in the bottom plate having concentric heads; two of the plugs in the top plate being adjusted both radially or laterally and longitudinally.

Fig. 2 is a sectional perspective view of a contact plug formed with a conical head, round and concentric with the shank thereof and the shank threaded into a plate substantially its entire length.

Fig. 3 is a sectional perspective view of a contact plug formed with a conical head and a square shank slidable in a plate.

Fig. 4 is a sectional perspective view of a contact plug formed with a conical head and a triangular shank slidable in a plate and an adjusting means and a lock means for the plug.

All of the modified forms of contact plugs shown in the drawing embody the features of my invention.

The drill jig shown in Fig. 1 in the accompanying drawing, selected to illustrate my invention, comprises, principally, the bottom jig plate A, the top jig plate B, the contact plugs C and C¹, and the object D which is located in the jig by the plugs.

The base or bottom jig plate A, in the present instance, has the two guide posts 10 and 11 extending upwardly therefrom.

The top jig plate B is spaced from the plate A and is movable up and down and has openings near each side through which the guide posts extended to guide the plate B in its up and down movements. The plate B may be moved up and down in any suitable manner or by any suitable means; no manner nor means being shown in the drawing.

The plate B has the bushing 12 substantially near the middle thereof to guide a tool for boring the hole 13 in the object D.

In the present instance, the plate A and the plate B each has three contact or positioning plugs; all of which are duplicates except that the plugs C in the top plate B have eccentric heads while the plugs C¹ in the bottom plate A have concentric heads.

The mounting of one of the plugs C is shown sectionally at the upper left hand end of the Fig. 1 where it is seen that the shank 14 extends through the plate B and has the nut 15 threaded to the upper end thereof.

Each of the plugs C shown has the round and conical head 16 and each of these heads is eccentric with the shank 14 in the present instance.

The plugs C¹ in the plate A have concentric heads and centralize or locate the flange 17 of the object D in relation to the posts 10 and 11. The plugs C in the plate B are spaced to centralize or locate the body portion 18 of the object D in relation to the posts 10 and 11 so that the bushing 12 guides a tool in such a manner that the hole 13 will be bored in proper relation to the body portion 18 or to the flange 17.

It is noted here that the spacing of the plugs C and C¹ need not be carried out accurately since the plugs are adjustable as will appear presently.

When the members are machined and assembled as shown and described, and the object D is in position in the jig, any one or all of the plugs can be adjusted to bring the object D into proper relation to the bushing 12.

In the present instance, this adjustment is accomplished by removing the nut 15 and placing washers 19 of suitable thicknesses between the head and the plate so that the head is thereby moved or held up or down as required to bring the bevel face of the head in such relation to the outer edge of the body 18 that the object D is located properly in relation to the bushing 12. It is obvious that the longitudinal adjustment of either one of the plugs, up or down, moves the object D bodily toward or away from the axis of the plug when the plate B is moved downward and thereby changes the relation between the bushing and that particular portion of the body 18 which is contacted by the bevel face of the plug. It is also obvious that the bevel face on the plugs also exerts a downward pressure on the object D to hold the object down onto the plate A when the plate B is moved downwardly and when the bevel faces of the plugs contact the object.

Therefore, the bevel face arrangement of the plugs centralizes or locates the object D as well as holds the same down on the plate A and thereby positions the object in the device, all of which is accomplished in one operation and the adjusting feature of the plugs permits of adjustment either as to localizing or to clamping or to both.

Variations which may occur in the object D, such as minor changes in design, changes due to casting, or forging, or other causes, or variations arising from inaccurate construction, either of the plates or of the plugs or of the apparatus generally, can readily be taken care of by the adjustable features of the present invention.

The longitudinal adjustment of the plugs C is accomplished by placing washers of suitable thicknesses between the head 16 and the plate. These washers provide a solid abutment for the head on the plate so that there is no danger of destroying the adjustment of the plugs after it is made. This washer adjustment is illustrated in Fig. 1 where the plug at the upper left hand end has two washers 19 while the other plug shown has three washers 20.

In addition to the longitudinal adjustment of the plugs C just described, these plugs can also be adjusted so that the bevel face thereon is adjusted laterally or rotatably.

As seen in Fig. 1, the plugs C have the heads 16 not only conical but also eccentric with the shanks 14; therefore, the bevel face of either of the plugs C can be moved toward or away from the bushing 12 when the plug is rotated without changing the longitudinal position of the plug and thereby also permits of adjustment similar to that attained by the longitudinal adjustment of the plugs and additional thereto so that either or both adjustment features may be used independently or conjointly.

For the purpose of illustration of this rotative or lateral adjustment, the plug C at the upper left hand end of Fig. 1 is shown with the most eccentric portion of the head 16 contacting the object D and the other plug is shown with the most eccentric portion of the head disposed away from the object so that a portion of less than the most eccentric portion contacts the object at that joint.

Since the heads 16 are conical, the object D is always not only centralized or located by the plugs C but is also held or clamped down on the plate A when the plate B is moved toward the plate A and the method of centralizing or locating the object as well as the method of clamping the object is accomplished by bevel faces moving toward and contacting the object.

In the plugs C, as well as in all of the other plugs shown on the drawing and described in this specification, the heads are larger, diametrically, than the shanks; thereby providing a substantial shoulder for a solid or rigid longitudinal abutment for the plugs. It is, of course, obvious that a bevel face can be provided on a plug which has no such larger head by lengthening the shank to provide a head portion and forming the bevel face on this head portion. It is also obvious that a bevel face can be provided on other structures and related to other members of a structure in such a manner that either the centralizing or locaizing or the clamping effect is attained.

The term "head", as used in this specification and in some of the claims, is used for convenience of expression and refers to that portion of the locating means which engages an object to be located or clamped irrespective of the size or the relation thereof to the shank or to other parts of a structure.

The contact plug E, shown as a locating plug in Fig. 2, has the shank 21 threaded into the plate A and the conical and round head 22 concentric with the shank. The nuts 23 and 24 are threaded to the shank and are tightened against the plate A when the plug is adjusted. In this structure, the plug must be rotated in order to adjust the bevel face thereof longitudinally; therefore, the conical head is made concentric as distinguished from the eccentric heads shown in Fig. 1, so that the bevel face does not change in its relation to the shank when the plug is rotated. When he plug E is rotated, the threaded engagement between the shank and the plate A moves the head longitudinally and thereby changes the relation of the bevel face to other parts of a structure.

The contact plug F, shown as a locating and clamping plug in Fig. 3, has the square shank 25 slidable in the plate B and the head 26 which has the bevel faced portion 27 projecting laterally beyond one side of the shank. It is obvious that the shank 25 may be made round or of other formation cross-sectionally.

Instead of the one bevel face shown in Fig. 3, the plug may have a head of more than one such bevel faces, or may have such bevel faces formed on a shank extension, either on any one or on any number of the sides of a polygonal shank. In stead of the square shank shown, the shank may be of other polygonal cross-section and the bevel faces, either flat as shown in Figs. 3 and 4 or of other formation, should be so disposed that the bevel face which contacts the object is directed toward the object when the polygonal shank is rotated to different positions in the plate.

The plug F, as shown in Fig. 3, is adjusted by moving the same longitudinally in the plate B to desired position and then clamping the same in position by means of the clamp plate 28 and the screws 29.

In addition to the longitudinal adjustment of the plug F just described, the shank 25 can be turned around axially into four rotative positions and thereby not only dispose the bevel portion 27 into four different directions but also dispose different bevel faces in one direction when additional bevel faces are provided on the plug.

The bevel face on this plug F, like those herein previously described, and those hereinafter described, is adapted to locate and to clamp an object when the plate B is moved toward that object and to afford ample adjusting facilities to adjust either the locating facilities of the plug or the clamping facilities of the plug either independently of each other or conjointly with each other.

The contact plug G, shown as a locating and clamping plug in Fig. 4, has the triangular shank 30 slidable in a suitable opening through the plate B and the conical head 31 which has the bevel faced portion 32 projecting beyond one of the sides of the triangular shank.

Instead of the one bevel face shown, the plug G may have additional bevel faces similar to those described in connection with the plug F and for similar purposes.

The plug G has the flange 33 at the upper end thereof. The stud 34 has one end thereof threaded into the plate B and the other end thereof being threaded and extending through the flange 33 and having the nut 35 on each side of the flange.

This stud and flange arrangement provides a means for minutely adjusting the plug longitudinally as well as affording a substantial abutment for the plug to retain the same in the longitudinally adjusted position.

The gib 36 has the tapered body 37 fitting to a complementary wall of the plug opening through the plate B and also has the flange 38.

The stud 39 has one end thereof threaded into the plate B and the other end thereof threaded and extending through the flange 38 with the nut 40 threaded thereon.

The triangular form of the shank 30 affords a substantial lateral abutment for the plug G and prevents lateral shifting thereof since the angular seat of the shank in the plate always retains the bevel face in a definite directional relation to the plate and the tapered body of the gib 36 always wedges the shank onto the angular seat when the nut 40 is tightened.

With the arrangement shown in Fig. 4, the plug can be adjusted minutely in a longitudinal direction and is positively held in that longitudinally adjusted position and is firmly held against an unyielding locating seat in a lateral direction.

It is observed that all of the plug means shown and described are so mounted that each can be removed or renewed at a very slight expense; that each plug means is adjustable as to the locating or to the clamping facility thereof, or to both of these facilities; that each plug means is adjustable either independently of the other plug means or conjointly with any or all of them; that each of the plug means has a substantial longitudinal and lateral abutment; that neither the plug means nor the jig structure needs to be machined accurately since the plug means are adjustable; that an object can be located in the jig in any desired position within the scope of the adjusting means of the plug means; and that the object can be clamped in the jig to any desired degree of pressure by adjusting the plug means in accordance with the movement of the element which effects the clamping.

I claim:—

1. A device of the character described having means adapted to position an object including a movable member, a positioning plug movably mounted in said movable member, means adapted to hold said plug in position in said movable member, said plug having a conical head eccentric with the body portion thereof, a portion of the conical surface of said head contactable on said object, and means adapted to move said plug into different relations with said movable member and thereby bring said conical surface into different positioning relations with said object and thereby vary the positioning effect of said plug.

2. A device of the character described having means adapted to position an object including a rotatably mounted positioning plug, means adapted to hold said plug against rotation, said plug having a conical head eccentric with the axis of rotation of said plug, a portion of the conical surface of said head contactable on said object, and means adapted to rotate said plug to move different portions of said conical surface into different contact relations with said object and thereby vary the positioning effect of said plug.

3. A device of the character described having means adapted to position an object including a longitudinally movable mounted positioning plug, means adapted to hold said plug against individual longitudinal movement, said plug having a conical head eccentric with the body portion thereof, a portion of the conical surface of said head contactable on said object, and means adapted to move said plug longitudinally to move different portions of said conical surface into different contact relations with said object and thereby vary the positioning effect of said plug.

4. A device of the character described having means adapted to position an object including a rotatably and longitudinally movable mounted positioning plug, means adapted to hold said plug against rotative and individual longitudinal movement, said plug having a conical head eccentric with the axis of rotation of said plug, a portion of the conical surface of said head contactable on said object, and means adapted to move said plug either rotatably or longitudinally or rotatably and longitudinally to move different portions of said conical surface into different contact relations with said object and thereby vary the positioning effect of said plug.

5. A device of the character described including means adapted to primarily position an object, and means adapted to finally position said object and including a plate guidedly movable toward and away from said primary positioning means, a plurality of positioning plugs carried by said plate, each of said plugs having a longitudinally bevel face to contact said object and being longitudinally adjustable in said plate to move different portions of said bevel faces thereon into positions to contact said object and thereby vary the positioning effects thereof, and lock means to hold said plugs in adjusted position.

6. A device of the character described including means adapted to support an object and positioning means including a movable member, a plurality of positioning plugs each rotatably mounted in said movable member and having a circular bevel face eccentric with the axis of rotation of the plug and contactable on said object upon movement of said movable member, and lock means to hold said plugs against movement thereof in said movable member.

7. A device of the character described including means adapted to support an object and positioning means including a movable member, a plurality of positioning plugs each rotatably and longitudinally movable mounted in said movable member and having an eccentric circular bevel face contactable on said object upon movement of said movable member, and lock means to hold said plugs against movement thereof in said movable member.

8. A device of the character described including a movable member carrying a guide bushing, a plurality of individual positioning plugs carried by said movable member and spaced in definite positions around said guide bushing, each of said plugs having a bevel face to contact an object angular to the movement of said movable member, and means for adjusting each of said plugs individually to move different portions of said bevel faces into contacting positions on said object and thereby vary the positioning effect of said bevel faces.

9. A device of the character described including a stationary base, a plurality of individual positioning plugs carried by said base, a movable member carrying a guide bushing in spaced relation to said plugs, a plurality of individual positioning plugs carried by said movable member and spaced in definite positions around said guide bushing, each of said plugs having a bevel face to contact an object angular to the movement of said movable member, and means for adjusting each of said plugs individually to move different portions of said bevel faces thereof into contacting positions on said object and thereby vary the positioning effect of said bevel faces.

10. A device of the character described including a base, guide means extending from said base, a movable plate guided on said guide means, a plurality of plugs each having a shank longitudinally adjustable mounted in said plate and a conical projection eccentric to the shank, spacing means to vary the longitudinal positions of said conical projections, and locking means to hold each of said plugs against longitudinal movement.

11. A device of the character described including a base, guide means extending from said base, a movable plate guided on said guide means, a plurality of plugs each having a shank rotatably and longitudinally adjustable mounted in said plate and a conical projection eccentric to the shank, spacing means to vary the longitudinal positions of said conical projections, and locking means to hold each of said plugs against both longitudinal and rotative movement.

12. A device of the character described including a base, a guide means extending from said base, a movable plate guided on said guide means and having a guide bushing therein, a plurality of plugs each having a shank rotatably and longitudinally adjustable mounted in said plate and symmetrically spaced from said bushing, having a conical projection eccentric to the shank, means comprising washers to vary the longitudinal positions of said projections, means on the upper end of each of said shanks to rotate said plugs, and lock nuts to hold said plugs against both longitudinal and rotative movement.

In testimony of the foregoing, I affix my signature.

GUY E. SWARTZ.